(12) United States Patent
Hafsa et al.

(10) Patent No.: US 11,887,361 B1
(45) Date of Patent: Jan. 30, 2024

(54) AUTOMATED WHITEBOARD CLEANING SYSTEM

(71) Applicant: KING FAISAL UNIVERSITY, Al-Ahsa (SA)

(72) Inventors: Noor E. Hafsa, Al-Ahsa (SA); M M A Sayeed Rushd, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/195,708

(22) Filed: May 10, 2023

(51) Int. Cl.
  *G06V 10/82* (2022.01)
  *B43L 21/00* (2006.01)
  *B43L 19/00* (2006.01)

(52) U.S. Cl.
  CPC .......... *G06V 10/82* (2022.01); *B43L 19/0006* (2013.01); *B43L 21/00* (2013.01)

(58) Field of Classification Search
  CPC .......... G06V 10/82; G06T 7/20; G06N 20/00; G06N 3/02; G06N 3/08
  See application file for complete search history.

(56) References Cited

U.S. PATENT DOCUMENTS

| 7,901,214 B1* | 3/2011 | Liebowitz | B43L 21/00 |
| | | | 434/412 |
| 2010/0245563 A1* | 9/2010 | Golovchinsky | H04N 7/18 |
| | | | 348/135 |
| 2020/0193222 A1* | 6/2020 | Singh | G06F 18/2431 |
| 2023/0245077 A1* | 8/2023 | Bhatt | G06N 3/08 |
| | | | 705/308 |

OTHER PUBLICATIONS

Ackerman, "Robot Learns to Clean Whiteboard, Schoolchildren Rejoice," IEEE Spectrum, Feb. 16, 2011.
Day, "A Robotic Whiteboard Cleaner Keeps The Board Ready To Go," Hackaday, Jun. 15, 2019.
Chavan et al., "Automatic White Board Cleaner," May 2019, International Journal of Computer Sciences and Engineering, 7(5):427-430.

* cited by examiner

*Primary Examiner* — Ross Varndell
(74) *Attorney, Agent, or Firm* — Nath, Goldberg & Meyer; Richard C. Litman

(57) ABSTRACT

A whiteboard cleaning system includes a user movement sensor that determines when a user is inactive; a whiteboard capture camera that makes an image of the whiteboard when the user movement sensor detects that the user is inactive; a classification module that classifies the image with a pre-trained image data set using an augmentation technique to enhance the size of the image data set and determines whether the whiteboard needs to be cleaned based on the classification, through transfer learning, using the image data set; and a wiper that cleans the whiteboard when the classification module determines that the whiteboard needs to be cleaned.

11 Claims, 4 Drawing Sheets

AUTOMATED WHITEBOARD CLEANING SYSTEM

BACKGROUND

1. Field

The present disclosure relates to cleaning systems, and particularly to an automated system and method for cleaning whiteboards.

2. Description Of The Related Art

Whiteboard cleaning devices are typically configured to erase a whiteboard upon appropriate user activation or user input to begin cleaning the whiteboard. In some cases these devices can determine where on the whiteboard marks are present, and can wipe those marks when instructed by a user. The foregoing systems, as described, require human intervention to determine when the whiteboard should be cleaned. The whiteboard is cleaned once a user instructs a device to begin cleaning the whiteboard.

Thus, an automated whiteboard cleaning system solving the aforementioned problems is desired.

SUMMARY

An automated whiteboard cleaning system is configured to determine when a whiteboard needs to be cleaned, and then cleans the whiteboard automatically, without requiring instruction by a user.

An automated whitebaord cleaning system can detect markings on the whiteboard and automatically determintes when to clean the whiteboard, without any human involvement. Therefore, the whiteboard cleaning process is a 100% automated system, that requires no manual input. The system can have an autonomous decision module that determines when to start the wiping process. The module includes algorithmic steps, including automated detection of the state of the whiteboard (requires cleaning or not) by image classification, and monitoring user movements in the proximity of the board before making the decision to clean or not to clean the whiteboard. Once the algorithm makes the decision to wipe the whiteboard, a control signal is sent to the automated wiper to start the wiping process, without any human intervention. The wiping process stops once the hardware finishes cleaning the whiteboard and the image classification module reports the cleanliness of the board.

A whiteboard cleaning system, in one embodiment, includes a user movement sensor that determines when a user is inactive; a whiteboard capture camera that makes an image of the whiteboard when the user movement sensor detects that the user is inactive; a classification module that classifies the image and determines whether the whiteboard needs to be cleaned based on the classification; and a wiper that cleans the whiteboard when the classification module determines that the whiteboard needs to be cleaned.

The user movement sensor, in some embodiments, determines the user is inactive when there is no movement near the whiteboard by the user for over 60 seconds. Alternatively, the user movement sensor determines the user is inactive when the user has not written on the whiteboard for over 60 seconds.

The user movement sensor and the whiteboard capture camera are the same camera in other embodiments.

The classification module, in some embodiments, is pre-trained with an image data set distinguishing between whether a whiteboard needs to be cleaned or does not need to be cleaned. In another embodiment, the classification module classifies the image using an image dataset distinguishing between whether a whiteboard needs to be cleaned or does not need to be cleaned. Alternatively, the classification module classifies the image using a deep learning classification model. The classification module can also be pre-trained with an image data set using an augmentation technique to enhance the size of the image data set. The classification module can also classify the image, through transfer learning, using an image data set.

A method for cleaning a whiteboard includes determining whether a user is inactive through a user movement sensor; capturing an image of the whiteboard if the user is determined to be inactive through a whiteboard capture camera; determining whether the whiteboard requires cleaning based on an assessment of the image using a classification module; and cleaning the whiteboard with an automated wiper if the whiteboard is classified as requiring cleaning.

A user is determined inactive if there is no movement near the whiteboard by the user after a predetermined period of time, e.g., 60 seconds. Alternatively, a user is determined inactive if the user has not written on the whiteboard for more than a predetermined period of time, e.g., 60 seconds.

The method can further include pre-training the classification module using an image data set distinguishing between whether a whiteboard needs to be cleaned or does not need to be cleaned.

The method can also classify the image using a deep learning classification module.

The image can be classified by pre-training the classification module with an image data set using an augmentation technique to enhance the size of the image dataset.

The method can further include classifying the image, through transfer learning, using an image data set.

A whiteboard cleaning system includes a user movement sensor that determines when a user is inactive; a whiteboard capture camera that takes an image of the whiteboard when the user movement sensor detects that the user is inactive; a classification module that classifies the whiteboard as requiring cleaning or not using a pre-trained image data set using an augmentation technique to enhance the size of the image data set; and determines whether the whiteboard needs to be cleaned based on the classification, through transfer learning, using the image data set; and a wiper that cleans the whiteboard when the classification module determines that the whiteboard needs to be cleaned.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

An automated whiteboard cleaning system includes autonomous intelligent software and hardware necessary for cleaning a whiteboard. The software is designed using artificial intelligence (AI) for detecting the state of the whiteboard, i.e., if it is necessary to clean the whiteboard. The synergistic combination of image processing and machine learning is used for this purpose. The hardware can include a microcontroller with an attached camera sensor that captures images of the whiteboard on a specific interval and supplies them to the image classification software. The software application can be trained on a collection of whiteboard images using advanced AI algorithms that perform binary classification of the images. Additionally, the microcontroller can have a motion sensor for monitoring the user's mobility around the whiteboard. If the whiteboard needs to be cleaned and the user remains inactive for a specific time, then the microcontroller will send a signal to the automated wiping system to start the erasing process.

Figure 1:
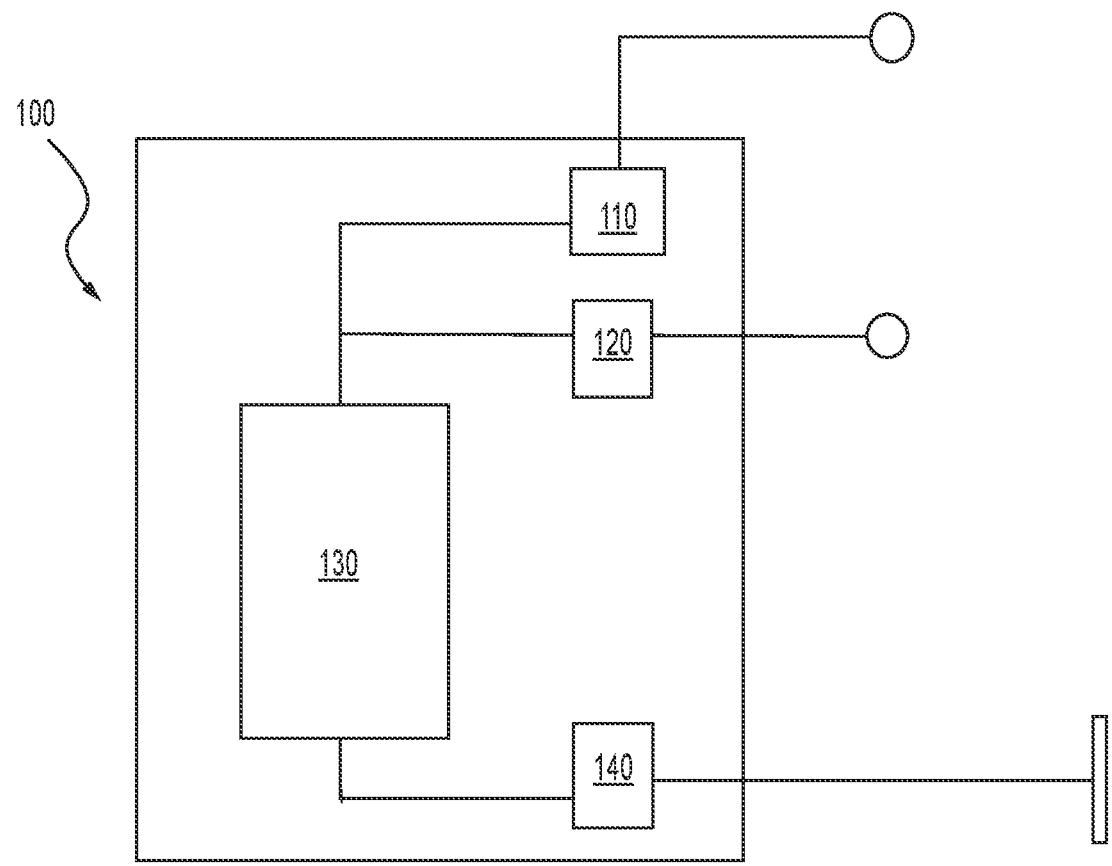
FIG. 1 is an illustration of a whiteboard cleaning system.

FIG. 1 is an illustration of a whiteboard cleaning system 100. It includes a user movement sensor 110 that determines when a user is inactive. The user movement sensor 110 can be a motion sensor that detects the user's mobility in the vicinity of the whiteboard and sends a signal to a microcontroller.

A whiteboard capture camera 120 captures an image of the whiteboard when the user is inactive for a specific time, e.g., 60 seconds. This can be, for example, when there is no movement near the whiteboard by the user for over 60 seconds, or when the user has not written on the whiteboard for over 60 seconds. These are non-limiting examples and there are other ways to determine when a user is inactive, which are included as part of this disclosure.

A classification module 130 classifies the image and determines whether the whiteboard needs to be cleaned based on the classification. The image is classified into either a 'yes' (cleaning is necessary) or 'no' (cleaning is not necessary) category. The classification module is, in some embodiments, a microprocessor containing the classification software coded with a python script.

A wiper 140 cleans the whiteboard when the classification module 130 determines that the whiteboard needs to be cleaned (e.g. is in the 'yes' category). A python script can be written to implement the logical workflow of the system i.e. to receive the signal from the user movement sensor 110, call a predict function in the classification module 130 when the user is inactive for certain periods, check the result of the classification output, and send a turn-on signal to the wiper 140 based on the classification outcome.

The user movement sensor 110 and the whiteboard capture camera 120 can be, in some embodiments, the same camera. In other embodiments the user movement sensor 110 and the whiteboard capture camera 120 can be the same sensor.

The classification module 130, in some embodiments, is pre-trained with an image data set distinguishing between whether a whiteboard needs to be cleaned or does not need to be cleaned. In another embodiment, the classification module 130 classifies the image using an image data set distinguishing between whether a whiteboard needs to be cleaned or does not need to be cleaned. Alternatively, the classification module 130 classifies the image using a deep learning classification model. In some embodiments, the classification module 130 can be pre-trained with an image data set using an augmentation technique to enhance the size of the image data set. The classification module 130 can also classify the image, through transfer learning, using an image data set.

The image classification module 130 is installed in a microcontroller and is used to determine the necessity of cleaning the whiteboard. The input of the classification module can be a two-dimensional (2D) image of the whiteboard, whereas the output can be a binary decision which can be described as follows:

1. Cleaning is necessary: yes; and
2. Cleaning is not necessary: no.

In an embodiment, the whiteboard image classification module 130 is trained using a 2D convolutional neural network (CNN) deep learning architecture. The image dataset is pre-processed for achieving image normalization. Further, an "augmentation" technique is applied to enhance the size of the dataset. To handle the image classification problem, a "transfer learning" approach is used, which allows the use of a pre-existing model trained on an external dataset for the custom task. In this approach, the initial weighting coefficients are extracted from the pre-trained model e.g. ResNet50, and the top layers of that base model are trained on a custom-made database of whiteboard images, for the task of classifying the images into the binary classes. The database consists of whiteboard images filled in with different amounts of text and labelled with 'yes' or 'no' classes. After training the classification module, the module is used to classify the new whiteboard images into either a 'yes' or 'no' class.

Figure 2A:
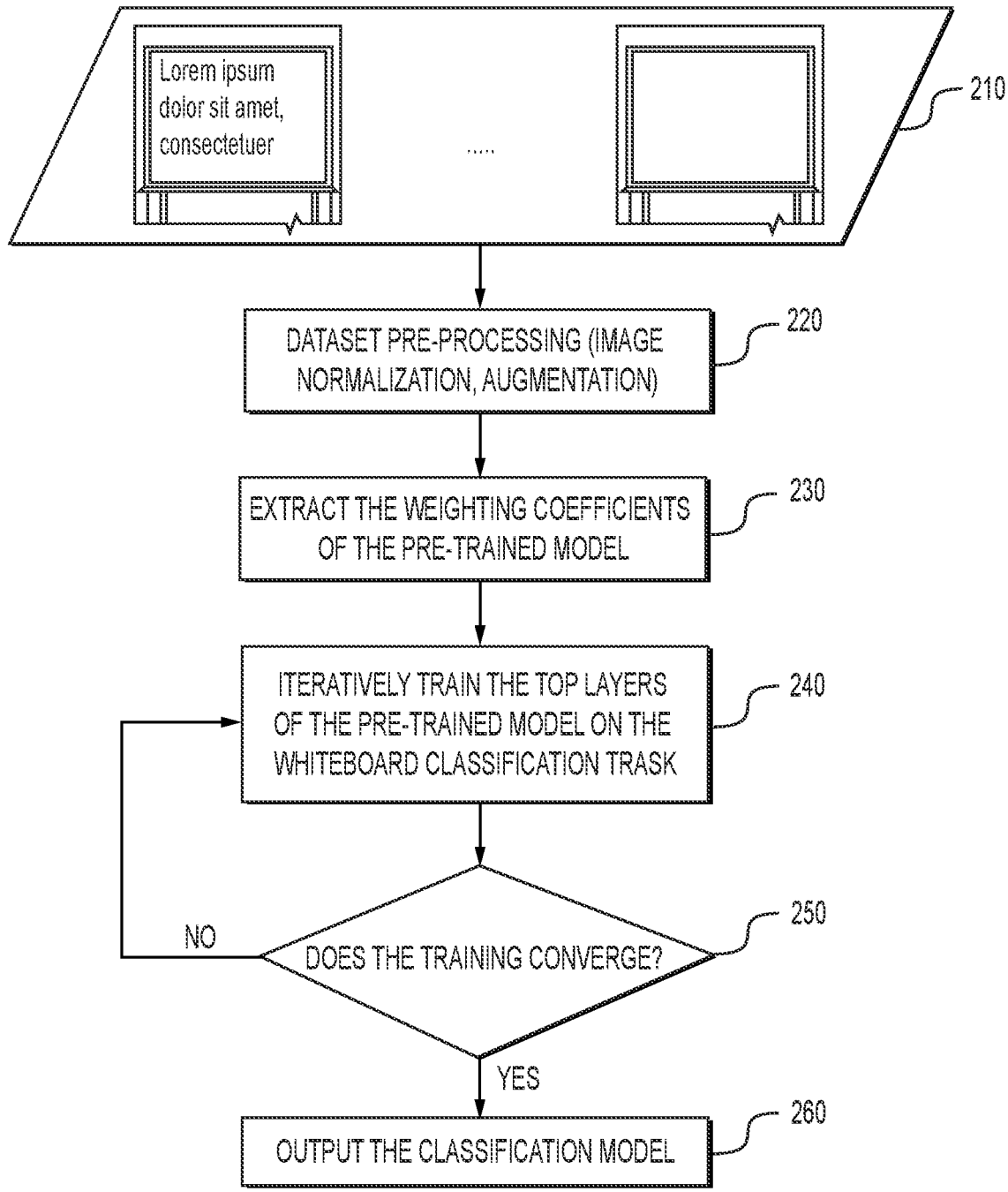
FIG. 2A is a flow chart for creating a classification model.

FIG. 2A is a flow chart for creating a classification module. Step 210 shows multiple samples being input into the classification module. Data set pre-processing in the form of image normalization and augmentation is performed in step 220. The weighting coefficients of the pre-trained module are extracted in step 230. The top layers of the pre-trained module on the whiteboard classification task are iteratively trained in step 240. Once the training converges in step 250, the classification module is output in step 260.

Figures 2B, 2C:
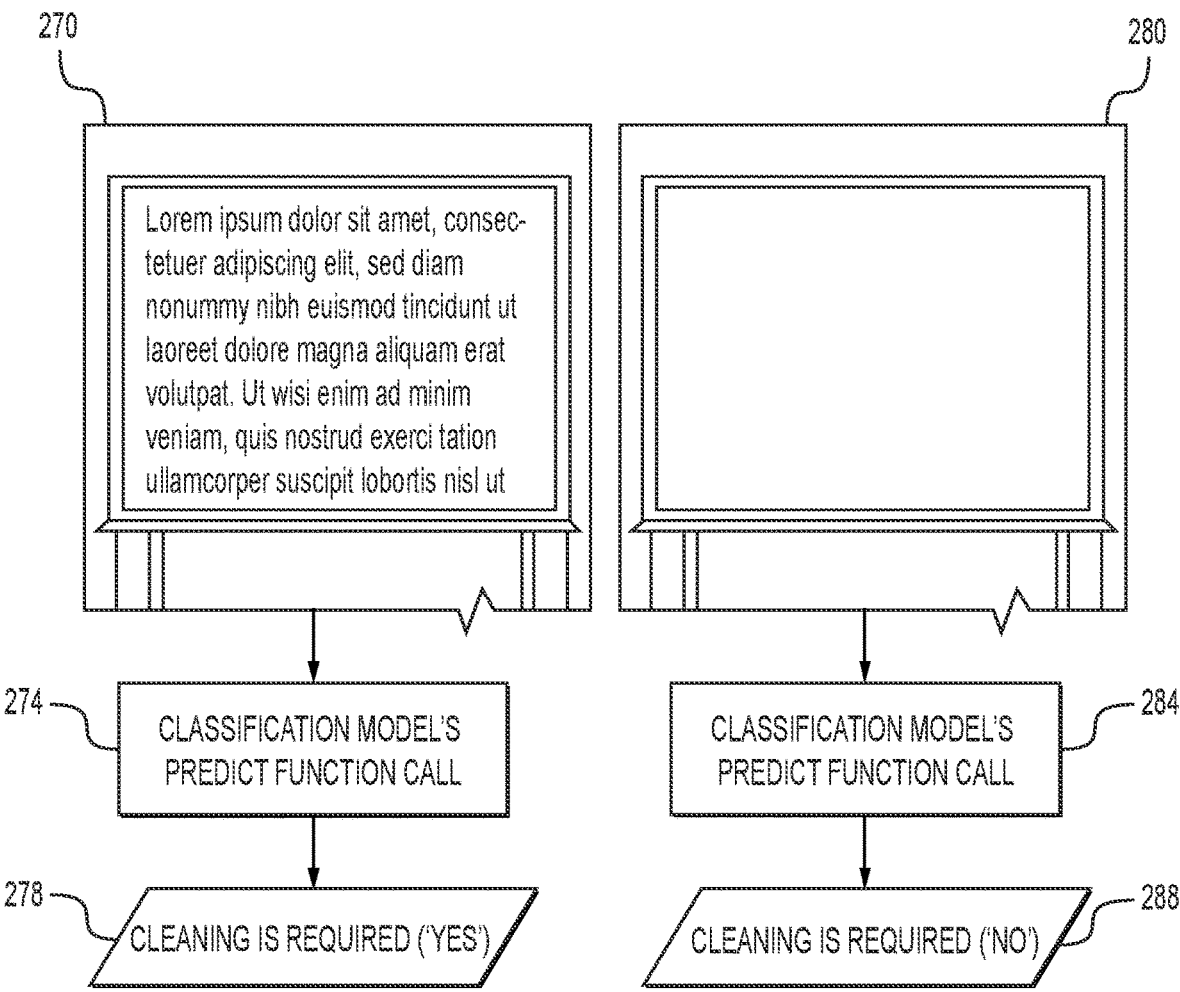
FIG. 2B is a flow diagram showing the testing of a classification model.
FIG. 2C is a flow diagram showing the testing of the classification model.

FIG. 2B is a flow diagram showing the testing of the classification module output in step 260. An input is made in step 270. The classification module is used on the input in step 274. A comparison is made between the input and classification module to make a determination on the need to clean the whiteboard, 'Yes', in step 278.

FIG. 2C is a flow diagram showing the testing of the classification module output in step 260. An input is made in step 280. The classification module is used on the input in step 284. A comparison is made between the input and classification module to make a determination on the need not to clean the whiteboard, 'No', in step 288.

Figure 3:
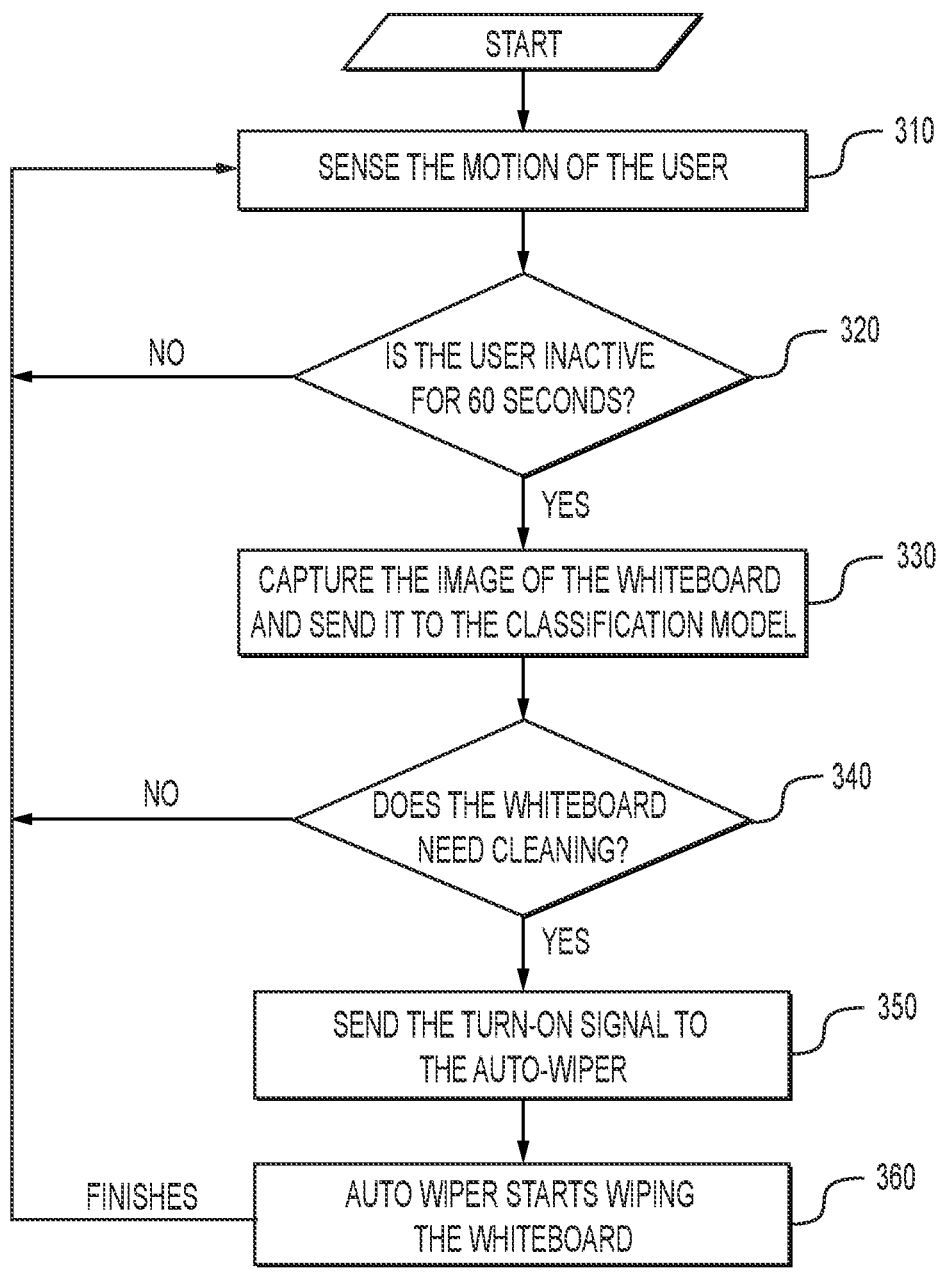
FIG. 3 is a flow diagram of a method of cleaning a whiteboard.

FIG. 3 is a flow diagram of a method of cleaning a whiteboard. The motion of a user is sensed in step 310. A determination is made in step 320 of whether the user has been inactive for 60 seconds. If the user has been inactive for at least 60 seconds, an image of the whiteboard is captured and sent to the classification module in step 330. A determination is made, using the classification module, in step 340, of whether the whiteboard needs cleaning. If the whiteboard does need cleaning, a signal is sent to a wiper, in step 350, to begin cleaning the whiteboard. The wiper begins cleaning the whiteboard in step 360. Once the whiteboard is cleaned the process begins again and loops back to step 310.

User inactivity can be defined in many ways. It can be defined, for example, as having no movement near the whiteboard by the user for a period of time, e.g., at least 60 seconds. Alternatively, if a user has not written on the whiteboard for more than a period of time, e.g., more than 60 seconds, this could be defined as user inactivity. It is noted that 60 seconds is only an example of a time frame and other time frames are included in this disclosure.

The classification module, in some embodiments, is pre-trained with an image data set distinguishing between whether a whiteboard needs to be cleaned or does not need to be cleaned. In another embodiment, the classification module classifies the image using an image dataset distinguishing between whether a whiteboard needs to be cleaned or does not need to be cleaned. Alternatively, the classification module classifies the image using a deep learning classification module. The classification module can also be pre-trained with an image data set using an augmentation technique to enhance the size of the image data set. The classification module can also classify the image, through transfer learning, using an image data set.

It is to be understood that the system and method for cleaning a whiteboard are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for cleaning a whiteboard, comprising:
   determining whether a user is inactive through a user movement sensor;
   capturing an image of the whiteboard to establish an image data set if the user is determined to be inactive through a whiteboard capture camera;
   determining whether the whiteboard needs to be cleaned based on a classification of the image using a classification module, and applying the detection of when the user is inactive, through transfer learning, using the image data set, using an augmentation technique to enhance the size of the image data set; and
   receiving, the determination from the classification module whether the whiteboard needs to be cleaned, and cleaning the whiteboard if the classification module determines that cleaning is required,
   wherein determining whether the whiteboard needs to be cleaned comprises pre-training the classification module with the image data set using an augmentation technique to enhance the size of the image database.

2. The method as recited in claim 1, wherein a user is determined inactive if there is no movement near the whiteboard by the user for a predetermined period of time.

3. The method as recited in claim 1, wherein a user is determined inactive if the user has not written on the whiteboard for a predetermined period of time.

4. The method as recited in claim 1, further comprising pre-training the classification module using an image data set distinguishing between whether a whiteboard needs to be cleaned or does not need to be cleaned.

5. The method as recited in claim 1, wherein the image is classified using a deep learning classification model.

6. A whiteboard cleaning system, comprising:
   a user movement sensor that determines when a user is inactive;
   a whiteboard capture camera that makes an image of the whiteboard to establish an image data set when the user movement sensor detects that the user is inactive;
   a classification module that classifies the image using the pre-trained image data set using an augmentation technique to enhance the size of the image data set and determines whether the whiteboard needs to be cleaned based on the classification and applying the detection of when the user is inactive, through transfer learning, using the image data set; and
   a wiper that receives the determination from the classification module whether the whiteboard needs to be cleaned, and cleans the whiteboard when the classification module determines that the whiteboard needs to be cleaned and the user is inactive,
   wherein determining whether the whiteboard needs to be cleaned comprises said pre-training the classification module with the image data set using an augmentation technique to enhance the size of the image database.

7. The whiteboard cleaning system as recited in claim 6, wherein the user movement sensor determines the user is inactive when there is no movement near the whiteboard by the user for a predetermined period of time.

8. The whiteboard cleaning system as recited in claim 6, wherein the user movement sensor determines the user is inactive when the user has not written on the whiteboard for a predetermined period of time.

9. The whiteboard cleaning system as recited in claim 6, wherein the user movement sensor and the whiteboard capture camera are the same camera.

10. The whiteboard cleaning system as recited in claim 6, wherein the classification module is pre-trained with an image data set distinguishing between whether a whiteboard needs to be cleaned or does not need to be cleaned.

11. The whiteboard cleaning system as recited in claim 6, wherein the classification module classifies the image using a deep learning classification model.

* * * * *